United States Patent Office 3,334,051
Patented Aug. 1, 1967

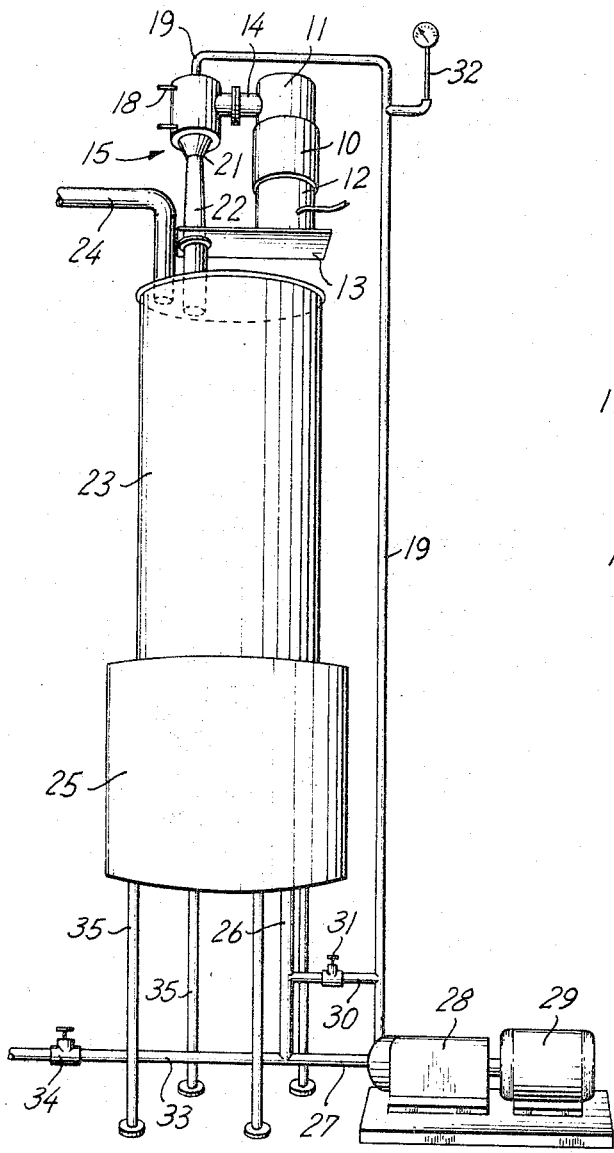
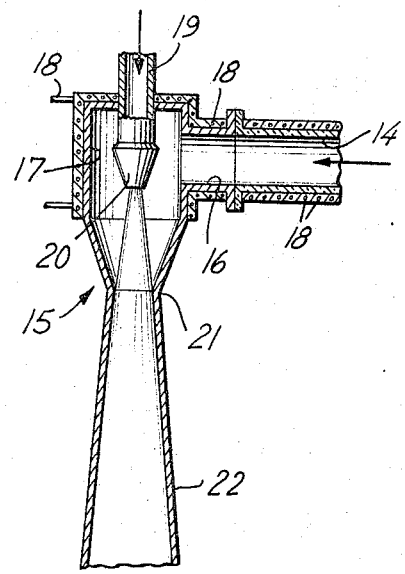

3,334,051
METHOD OF PREPARING COLLOIDAL SOLUTION OF IODINE
William B. Kinyon, Helmetta, and Wilbert Moody Wilson, Morristown, N.J., assignors to Helme Products, Inc., Helmetta, N.J.
Filed July 16, 1964, Ser. No. 383,135
1 Claim. (Cl. 252—314)

ABSTRACT OF THE DISCLOSURE

In abstract, this invention relates to heat quenching or condensation of iodine vapors to form an aqueous colloidal iodine solution by entrapment in a jet spray of suitable cold aqueous solution of an iodine resistant protective organic colloid.

---

This invention relates to the preparation of solutions of colloidal iodine by a new method, to the products so prepared, and to the apparatus used.

The conventional manner of preparing colloidal iodine solutions is with the aid of colloid mills which, for example, pass a relatively coarse suspension iodine between two closely spaced oppositely rotating discs thereby shearing the iodine particles to colloidal dimensions.

Various other mechanical methods of reducing iodine and other solid suspensions to particles within the colloidal range are known but all of them give relatively erratic results in that the size of the colloidal particles are not uniform but rather within a relatively large range of particle size.

It is an objective of this invention to provide a colloidal solution of iodine of substantially uniform size particles.

It is another objective to provide an economical process for preparing colloidal iodine.

It is a further objective to provide a process that is free of mechanically moving parts normally used in the reduction of particles of iodine to within the colloidal range.

It is a further objective to provide a method of preparing colloidal sized particles without the necessity of shearing or grinding of iodine particles to within the colloidal range.

It is a further objective to provide a concentrated colloidal iodine solution by multiple passes of the aqueous solution through the apparatus.

These and other objectives of this invention will become apparent from the following descriptive disclosure.

The colloidal iodine of this invention is prepared by entrapment of sublimate iodine vapor in a suitable aqueous solution with suitable mixing at the moment of entrapment.

According to this invention iodine is sublimated by use of heat leaving behind any impurities as an ash in the retort or crucible.

The hot sublimate vapors are lead to a venturi throat where the hot vapors of molecular dimensions are quenched with a cold aqueous solution containing a protective colloid.

The instantaneous quenching and mixing of the sublimate vapors produces a colloidal solution of uniform particle size since the grinding or shearing action of the large particles of the prior art used in the mechanical colloidal mills is avoided.

In short, in this invention the iodine is substantially condensed in the molecular size of its vapor state so that the shearing action used to make colloidal iodine in conventional mechanical mills is wholly avoided.

This invention is illustrated by the accompanying drawing in which;

FIG. 1 is a side elevation view of the apparatus showing the re-cycle pump, the heated sublimation crucible, the venturi element and the storage chamber, and FIG. 2 is a section view taken through the venturi element showing the manner of commingling sprayed re-cycle solution with hot sublimate vapor.

Turning to the drawing, a heat insulated glass sublimation crucible or retort 10 is provided with a hood 11. It is disposed upon an electrically heated hot plate 12 which in turn is disposed upon a platform 13.

The iodine crystals to be sublimated are poured into the crucible 10. Upon heating the crucible the vapors gather in hood 11 and are conducted through conduit 14 into the venturi unit 15.

The conduit 14, which may be of glass or a glass lined metal tube, is secured to the conduit 16 leading to the inlet chamber 17 of the venturi 15 by conventional flange means. The chamber 17 and conduits 14 and 16 are preferably heated by electrical means 18 to prevent the condensation of sublimated iodine thereon.

As shown in FIG. 2, the end of re-cycle pipe 19 is suitably located in chamber 17 and is provided with a jet spray nozzle 20.

The location of nozzle 20 within the chamber 17 and relative to conduit 16 is very important with regard to the commingling and condensation of iodine vapor with the sprayed re-cycle solution. Similarly, the location of the orifice of the nozzle 20 relative to the throat or constriction 21 of the venturi is important with regard to the suction effect on the iodine vapors as well as with regard to efficient mixing of the condensate.

In short, the iodine vapors in conduit 16 must be heat quenched by the jet spray from nozzle 20 under optimum conditions in order to obtain the desired size of colloidal particles of this invention, which size is about one fiftieth of a micron.

The colloidal solution of iodine passing through the constriction 21 is conducted by means of conduit 22 to a separator storage tank 23 wherein any air present is separated from the solution and led to the atmosphere through exhaust pipe 24.

As shown in FIG. 1, the platform 13 is secured to the conduit 22. However, an independent platform 13 is also operable.

A cooling jacket 25 is disposed about the base of the tank to cool the liquid therein which when cooled is re-cycled by way of glass conduits 26 and 27 and glass lined pump 28, driven by electrical motor 29, into glass conduit 19.

A by-pass glass conduit 30 having a valve 31 may be provided. A gauge 32 is desirable to show the pressure in the piping system.

The prepared or final solution is removed from tank 23 by way of glass conduit 33 and valve 34 thereon.

Preferably the tank 25 is supported on a plurality of legs 35 for convenience of operation of the apparatus.

Iodine vapors and iodine solutions are extremely corrosive to metals so that glass tubing, or glass lined tubing of suitable properties must be used.

According to this invention, hot iodine vapors are introduced into the venturi element 15 at the point of greatest constriction 21 and in the vicinity immediately thereabove and are quenched with mixing in the aqueous spray stream being re-cycled.

The speed of the re-cycle solution produces a vacuum into which the iodine vapors flow.

The aqueous protective colloid solution initially used, is prepared at room temperature and contains from about .002 to about 30 percent of a protective colloid gum. Any protective colloid gum of low iodine value is operable. However, gum acacia or gum tragacanth is preferred.

By way of example of the preparation of a colloidal solution, twenty pounds of commercial iodine was heated in a suitable glass crucible and sublimated. The sublimate was led overhead to the throat 21 of the venturi 15 disposed in a piping system in which an aqueous solution of ten percent acacia gum was dissolved at room temperature. Upon re-cycling a final colloidal iodine solution of 8 percent concentration was obtained.

The final solution was adjusted to about four percent iodine by weight for normal use.

However, by repeated re-cycling through the venturi element to condense more newly formed iodine sublimate vapors, a solution of up to ten percent or more iodine strength is obtainable.

A solution of about two percent iodine concentration may be prepared simply by less re-cycling of the iodine solution through the venturi element.

The pressure of the water at the jet stream of the re-cycle solution immediately above the venturi throat is about sixty pounds per square inch and this pressurized aqueous solution in passing through the venturi creates spray droplets the suction of which pulls in the hot sublimate iodine vapors into the venturi throat to produce an instantaneous condensation and colloidal solution formation.

Thus, according to this invention the pumped jet stream of pressurized aqueous protective colloid solution or re-cycle solution is piped to a point just above the venturi throat. The jet stream issuing from the mouth of the pipe is exposed to atmospheric pressure and is broken up into tiny droplets as it passes toward and through the venturi throat. In practice the diameter of the nozzle for the aqueous solution is less than the diameter of the venturi throat.

This invention was described by means of illustrative embodiments thereof but it is not limited to these illustrations as it is of a generic scope.

We claim:

The method of preparing a colloidal solution of iodine of substantially uniform size particles comprising heat sublimating crude iodine to produce iodine vapor and condensing said iodine vapors in a jet stream of an aqueous solution of about 0.002 to about 30 percent of an organic colloid selected from the group consisting of gum acacia and gum tragacanth.

References Cited

UNITED STATES PATENTS

| 1,866,923 | 7/1932 | Chandler | 252—313 |
| 2,127,571 | 8/1938 | Pardee | 23—154 |

LEON D. ROSDOL, *Primary Examiner.*

R. D. LOVERING, *Examiner.*